(12) United States Patent
Nakao

(10) Patent No.: US 7,551,611 B2
(45) Date of Patent: Jun. 23, 2009

(54) RADIO APPARATUS

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 448 days.

(21) Appl. No.: 11/522,969

(22) Filed: Sep. 19, 2006

(65) Prior Publication Data

US 2007/0064687 A1  Mar. 22, 2007

Related U.S. Application Data

(60) Provisional application No. 60/719,219, filed on Sep. 22, 2005.

(51) Int. Cl.
*H04Q 11/00* (2006.01)
(52) U.S. Cl. ........................ 370/358; 370/510
(58) Field of Classification Search ............. 370/203, 370/208, 332, 333, 339, 391, 358; 375/295
See application file for complete search history.

(56) References Cited

U.S. PATENT DOCUMENTS

| | | |
|---|---|---|
| 2003/0072452 A1 | 4/2003 | Mody et al. |
| 2003/0161384 A1* | 8/2003 | Chun et al. .......... 375/130 |
| 2003/0216156 A1* | 11/2003 | Chun ................. 455/562.1 |
| 2005/0163236 A1 | 7/2005 | Hammerschmidt et al. |
| 2006/0013327 A1* | 1/2006 | Sugar et al. .......... 375/260 |
| 2006/0182017 A1* | 8/2006 | Hansen et al. ........ 370/208 |

FOREIGN PATENT DOCUMENTS

JP    2006-179879    6/2006

OTHER PUBLICATIONS

Sinem Coleri et al., "Channel Estimation Techniques Based on Pilot Arrangement in OFDM Systems," IEEE Transactions on Broadcasting, Sep. 2002, pp. 223-229, vol. 48, No. 3.
"TGn Sync" An IEEE 802.11n Protocol Standard Proposal Alliance, Agere Systems, Inc. XP-002410959 International Search Report dated Jan. 17, 2007.

* cited by examiner

*Primary Examiner*—Chirag G Shah
*Assistant Examiner*—Daniel Mitchell
(74) *Attorney, Agent, or Firm*—McDermott Will & Emery LLP

(57) ABSTRACT

A control unit produces a packet signal composed of a plurality of streams, based on a plurality of inputted data signals. For each of a plurality of data signals, a baseband processing unit multiplies the produced packet signal by a weight vector. The control unit appends a common known signal to a header portion of a plurality of data signals, and appends a dedicated known signal to a front part preceding a data signal by which a dedicated weight vector is to be multiplied, in the plurality of data signals. Of the produced packet signal, the baseband processing unit multiplies the dedicated known signal and a data signal assigned posterior to this dedicated known signal by the dedicated weight vector, and of the produced packet signal it multiplies a part by which no dedicated weight vector is to be multiplied, by a common weight vector.

5 Claims, 9 Drawing Sheets

FIG.4

RADIO APPARATUS

RELATED APPLICATIONS

This application claims the benefit of U.S. Provisional Patent Application No. 60/719,219, filed on Sep. 22, 2005 the disclosure of which Application is incorporated by reference herein.

BACKGROUND OF THE INVENTION

1. Field of the Invention

The present invention relates to radio apparatuses, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of a plurality of packets is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. To raise the transmission efficiency of such a MIMO system, the longer packet signal length is preferred. Thus, when transmitting the data to a receiving apparatus, a transmitting apparatus aggregates the data to be transmitted and then generates packet signals. Each terminal apparatus extracts the data transmitted thereto from the received packet signal.

Under these circumstances, the inventor of the present invention came to recognize the following problems to be solved. When the transmitting apparatus transmits data, there is a need to change the transmission condition. The transmission condition includes, for example, controlling the antenna directivity as in the beamforming. The change of a transmission condition results in the change in radio channel between a transmission apparatus and a receiving apparatus. However, when a plurality of data signals are arranged contiguously and the transmission condition is changed in the middle of the data signals, the receiving apparatus cannot estimate the channel characteristic associated with this changed transmission condition. Accordingly, the operation in which the beamforming is performed from the middle cannot be achieved without ever executing the beamforming in an anterior part of packet signal.

SUMMARY OF THE INVENTION

The present invention has been made under such circumstances and a general purpose thereof is to provide a radio apparatus that transmits packet signals in the event that a transmission condition is being changed in an intermediate part of packet signal.

In order to solve the above problems, a radio apparatus according to one embodiment of the present invention comprises: an input unit which inputs a plurality of data signals each of the data signals being composed of a plurality of streams; a generation unit which generates a single packet signal composed of a plurality of streams, based on the plurality of data signals inputted in the input unit; and a transmitter which multiplies the packet signal, generated by the generation unit, by a weight vector for each of the plurality of streams and which transmits the packet signal multiplied by the weight vector. The generation unit appends a common known signal to a leading part of the plurality of data signals and appends a dedicated known signal to a position anterior to a data signal by which a dedicated weight vector is to be multiplied in the transmitter among the plurality of data signals and, among the packet signals generated by the generation unit, the transmitter multiplies the dedicated known signal and a data signal placed posterior thereto by the dedicated weight vector and, among the packet signals generated by the generation unit, the transmitter multiplies a part, where no dedicated weight vector is to be multiplied, by a common weight vector.

According to this embodiment, different known signals are used in accordance with a weight vector to be multiplied, so that even in the middle of packet signal the packet signal can be transmitted by changing the transmission condition.

Among the plurality of data signals, the generation unit may generate packet signals after assigning a plurality of data signals to a posterior part has been performed on a data signal by which the dedicated weight vector is to be multiplied in the transmitter.

When among the plurality of data signals there is a data signal, where the common weight vector is to be multiplied, in the transmitter in a position posterior to a data signal where the dedicated weight vector is to be multiplied in the transmitter, the generation unit may append the common known signal to a position anterior to the data where the common weight vector is to be multiplied in the transmitter.

The generation unit may be such that a data signal of a high data rate is assigned to an anterior part of packet signal and a data signal of a lower signal is assigned toward a posterior part of packet signal.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4 illustrates packet formats in a communication system shown in FIG. 2;

DETAILED DESCRIPTION OF THE INVENTION

Figure 1:
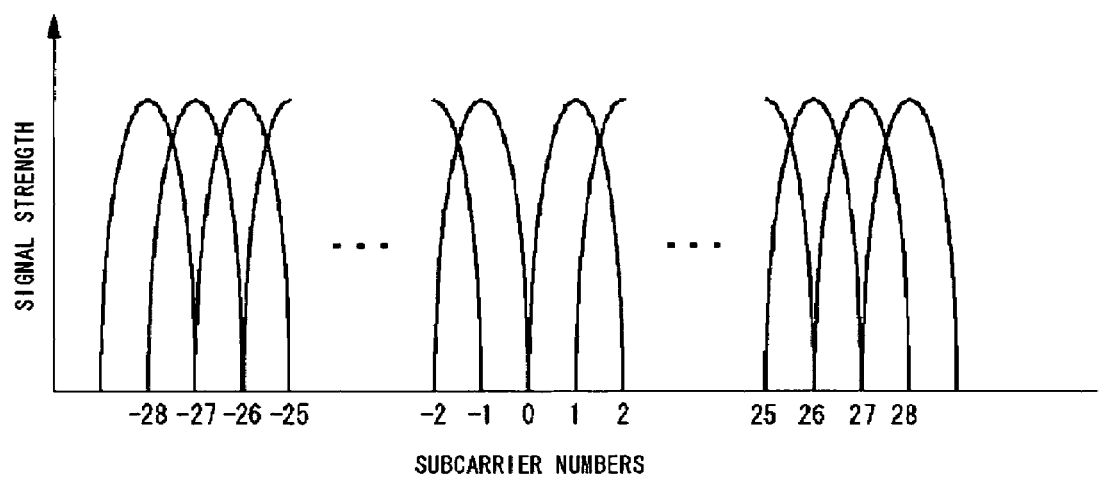
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments of the present invention relate to a MIMO system comprised of at least two radio apparatuses. One of the radio apparatuses corresponds to a transmitting apparatus whereas the other thereof corresponds to a receiving apparatus. The base station apparatus basically performs CSMA on a plurality of terminal apparatuses. In order to enhance the transmission efficiency, the base station apparatus aggregates data for a plurality of terminal apparatuses so as to produce a single packet signal. In particular, a plurality of data are arranged contiguously in order improve the transmission efficiency. However, in such an arrangement it is difficult to change the transmission condition in the middle of a packet signal. For example, the operation in which the beamforming is performed from the middle cannot be achieved without ever executing the beamforming in an anterior part of packet signal. Such an operation is done when data assigned in the middle of packet signal needs to be transmitted correctly. Under these circumstances, the base station apparatus will perform processing as follows.

When generating a packet signal by aggregating a plurality of data, the base station apparatus appends a known signal to a leading part thereof. While executing the beamforming, the base station apparatus specifies a terminal apparatus to which the data are to be transmitted. Further, the base station apparatus appends a known signal to a position anterior to the data for the specified terminal apparatus. Finally, when transmitting the specified data and the known signal anterior thereto, the base station apparatus executes the beamforming. And the base station apparatus does not execute the beamforming to the parts other than those. A receiving apparatus, which receives the data to which no beamforming has been executed, estimates the channel characteristics based on the known signal in the leading part and processes the received data. On the other hand, a receiving apparatus, which receives the data to which the beamforming has been executed, estimates the channel characteristics based on the beamformed known signal and processes the received data.

Now, if the transmission condition changes for each of a plurality of data contained in the packet signal, the number of known signals appended to the packet signal will increase. As a result, the transmission efficiency will deteriorate. At the same time, the base station will perform the processing as follows. When generating the packet signals, the base station apparatus assigns data, to which no beamforming has been executed, to an anterior part whereas the base station apparatus assigns data, to which the beamforming has been executed, to a posterior part. Accordingly, there is no need to have known signals other than those appended to the leading part. As a result, the number of known signals contained in the packet signal can be reduced and therefore the degradation in transmission efficiency is prevented.

As for the anterior part of packet signal, the following problems are yet to be solved. It is assumed herein that the data rate for a terminal apparatus is set variably. For example, the coding rate of error correction and the modulation scheme are set variably. It is to be noted that although the data rate is set variably by increasing or decreasing the number of streams in a MIMO, it is assumed here for the clarity of explanation that the number of streams does not change in each packet. At the time of receiving packet signals, a plurality of terminal apparatuses derive weights from known signals placed in the header portions of the packet signals, respectively, and execute adaptive array signal processing while using said weights derived. That is, the weight is not updated in the middle of a packet signal. As a result, the receiving characteristics are more likely to deteriorate in a posterior part of packet signal. The base station apparatus performs the processing as follows.

The base station apparatus assigns the data of a high data rate to an anterior part of the packet signal, and following this it assigns the data of a low data rate to a posterior part of the packet signal. When the data speed is regulated by the modulation scheme alone, the data of a modulation scheme having a larger number of multi-level, for example, the data of 64-QAM (Quadrature Amplitude Modulation) is assigned to a front part and the data of a modulation scheme having a smaller number of multi-level, for example, the data of BPSK (Binary Phase-Shift Keying) is assigned to a position following this. A terminal apparatus acquires, from among the packet signals, the data which is destined thereto and demodulates the acquired data. A terminal apparatus which shall demodulate the data of a high data rate acquires the data placed in an anterior part of the packet signal.

Accordingly, the difference between the timing at which the weights are derived and the timing at which the data are assigned becomes small. As a result, the error in weights on account of the variation in radio channel becomes smaller and therefore the deterioration in the receiving characteristics becomes smaller. On the other hand, a terminal apparatus which shall demodulate the data of a low data rate acquires the data placed in a posterior part of the packet signal. Thus, the difference between the timing at which the weights are derived and the timing at which data are assigned becomes large. As a result, the error in weights due to the variation in radio channel becomes larger, too. However, the deterioration in the receiving characteristics due to the error in weights is prevented if the data rate is low.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system which is not compatible with a MIMO system (hereinafter referred to as a "legacy system"). One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" as described earlier. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
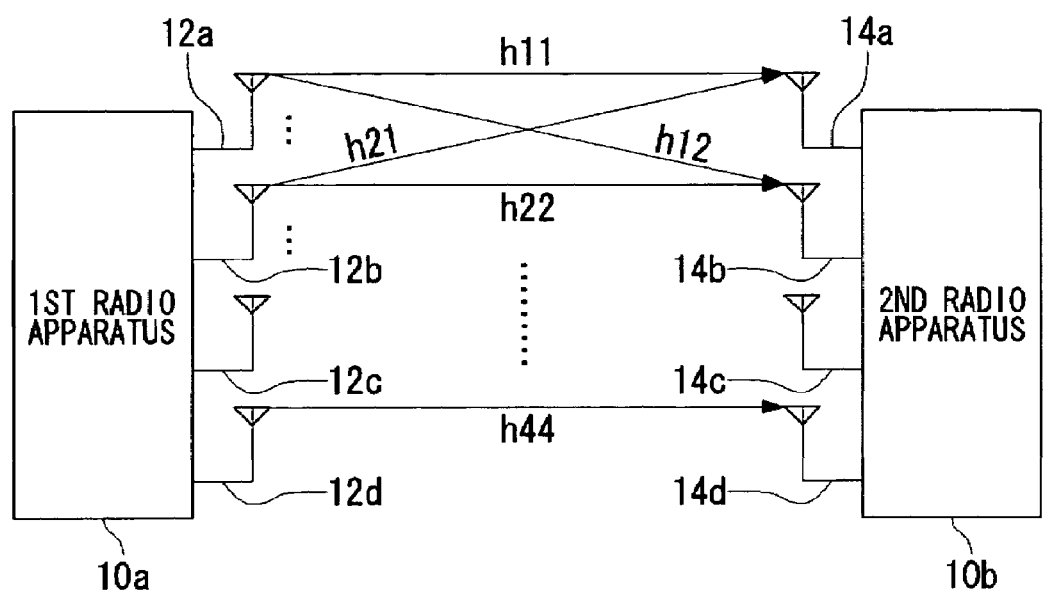
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be described as a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. Note that the roles of the first radio apparatus 10a and the second radio apparatus 10b may be reversed.

Figure 3:
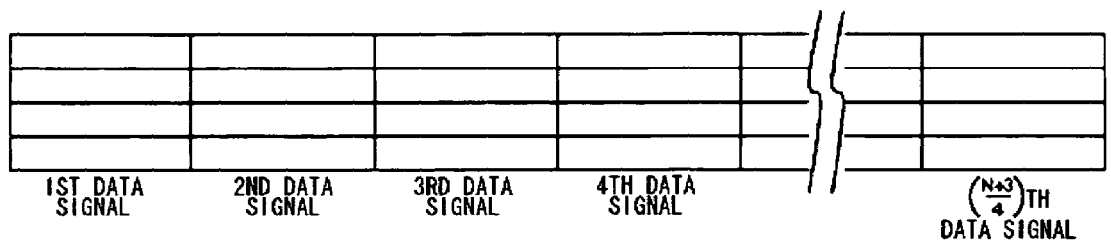
FIG. 3 illustrates a simple overview of the structure of packet signals according to an embodiment of the present invention.

FIG. 3 outlines a structure of a packet signal according to a preferred embodiment of the present invention. FIG. 3 represents a packet signal that is transmitted from a first radio apparatus 10a in FIG. 2, which is a base station apparatus. A plurality of data signals contained in the packet signal are explained here, and the structure of known signals and the like will be explained later. As shown, a packet signal includes a plurality of data signals, namely, "1st Data Signal" to "{(N+3)/4}-th Data Signal". Each data signal is composed of four streams. "Data Signal" here means a set of data interrelated with each other in a certain sense. The number of streams may be other than "4", but data signals are to be formed by the same number of streams throughout a single packet signal. On the other hand, a plurality of data signals are to be transmitted to their respective terminal apparatuses. A terminal apparatus corresponds to a second radio apparatus 10b of FIG. 2, but may also be any other radio apparatus 10 not shown in FIG. 2.

Further, it is assumed that the base station apparatus is already in receipt of information concerning terminal apparatuses for which a beamforming transmission is to be performed and information concerning terminal apparatuses for which a transmission other than a beamforming transmission (hereinafter referred to as "omni-transmission") is to be performed. Which of a beamforming transmission and an omni-transmission is used is determined in advance between the base station apparatus and each of the terminal apparatuses. For example, a beamforming transmission or an omni-transmission is determined upon a request from a terminal apparatus at the start of communication. The base station apparatus acquires data signals to be transmitted respectively to a plurality of terminal apparatuses. In accordance with the information mentioned above, the base station apparatus places data signals to be omni-transmitted to terminal apparatuses in an anterior part of packet signal. As a result, data signals to be beamforming-transmitted to terminal apparatuses are placed in a posterior part thereof.

In FIG. 3, "1st Data Signal" corresponds to data signals to be omni-transmitted whereas "{(N+3)/4}-th Data Signal" corresponds to data signals to be beamforming-transmitted. The base station apparatus appends a known signal to the foremost part of a plurality of data signals, which is the 1st Data Signal. Further, the base station apparatus appends a known signal to each of the data signals to be beamforming-transmitted. Hence, known signals are not attached to the data signals other than the 1st Data Signal, of the data signals to be omni-transmitted. This works to reduce the drop in transmission efficiency.

Further, it is assumed that the base station apparatus defines in advance the data rate at the transmission of data signals to a terminal apparatus. Here, a terminal apparatus transmits information on data rate to the base station apparatus, and the base station apparatus determined the data rate based on the information received. The base station apparatus arranges a plurality of data signals within a packet signal in such a manner that higher data rates for data signals to be omni-transmitted are placed in an anterior part thereof and lower data rates therefor in a posterior part thereof. In FIG. 3, therefore, the data rates are higher closer to the 1st Data Signal.

Figure 4:
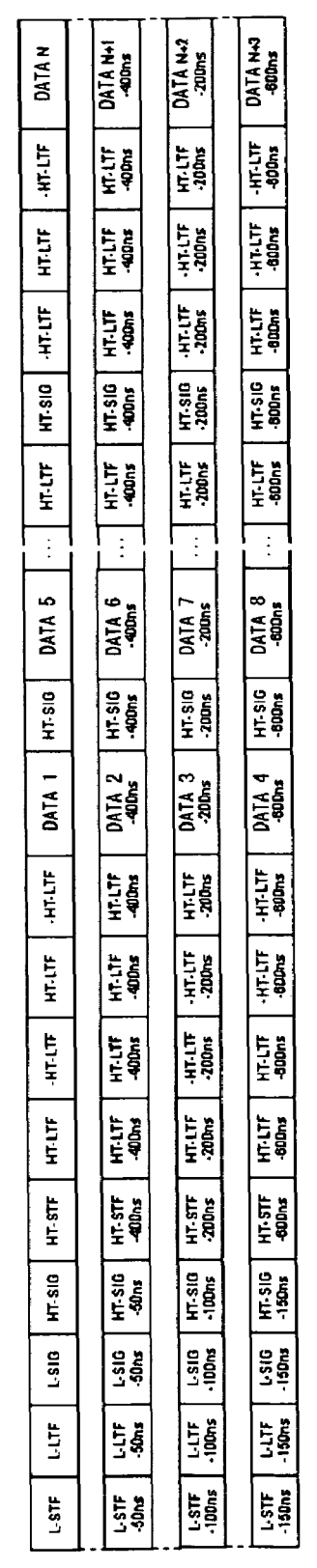

FIG. 4 illustrates a packet format for a communication system 100. FIG. 4, which is a detailed representation of a packet format shown in FIG. 3, corresponds to a case where the number of data streams is "4". "Data 1" and "Data 4" are both the first data, and the "HT-SIG" signals placed before them are the control signals for the data and contain the address and the like of the destination of the data. These data are equal to the "1st Data Signal" in FIG. 3. "Data 5" and "Data 8" are both the second data, and the "HT-SIG" signals placed immediately before them are the control signals on said data. These data correspond to the "2nd Data Signal" in FIG. 3. Also, "Data N" and "Data N+3" are the {(N+3)/4}-th data, which are the final data. These data correspond to the "{(N+3)/4}-th Data Signal" in FIG. 3.

In FIG. 4, the packet formats corresponding to the first to the fourth stream are shown, in order, from the top to the bottom, respectively. In the packet signal corresponding to the first stream, "L-STF", "HT-LTF" and the like are assigned as preamble signals. "L-STF", "L-LTF", "L-SIG", and "HT-SIG" are a known signal for AGC setting, a known signal for channel estimation and a control signal compatible with legacy system, and a control signal compatible with MIMO system, respectively. The control signal compatible with MIMO system, for example, contains information on the number of streams and a destination of data as described earlier. "HT-STF" and "HT-LTF" are a known signal for AGC setting and a known signal, for channel estimation, compatible with a MIMO system, respectively. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. In the packet signal corresponding to the third stream, "L-STF(−100 ns)", "HT-LTF(−200 ns)" and the like are assigned as preamble signals. In the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(−50 ns)" is "L-STF" given a cyclic timing shift by a delay of −50 ns. Note that L-STF and HT-STF are each structured by a repetition of an 800 ns duration and that the other parts such as HT-LTF are each constituted by a repetition of a 3.2 μs duration. It is also to be noted that "Data 1" to "Data 4" are also subjected to CDD and the amounts of timing shift are of the same values as those for HT-LTFs assigned anterior thereto.

In the first stream, HT-LTFs are assigned in the order of "HT-LTF", "-HT-LTF", "HT-LTF" and "-HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+ fourth component" for received signals of all the streams. The receiving apparatus extracts a desired signal for the fourth stream by computing "first component +second component−third component−fourth component" for received signals of all the streams. Note that the addition and subtraction processing is done by vector operation.

As with a legacy system, "52" subcarriers are used for the parts from "L-LTF" to "HT-SIG" and so forth. Note that "4" subcarriers out of the "52" subcarriers correspond to pilot signals. On the other hand, the part of "HT-LTF" or the like and thereafter uses "56" subcarriers. Thus far the description has been given of signals appended to the positions anterior to "Data 1" and the like. Part of signals appended corresponds to known signals appended to the 1st Data Signal of FIG. 3. "Data 5" to "Data 8" assigned posterior to "Data 1" to "Data 4" are data to be omni-transmitted. Hence, no known signal is assigned anterior to "Data 5" to "Data 8". And "HT-SIGs" only, which are control signal, are assigned anterior to "Data 5" and "Data 8".

The known signals, such as "HT-LTFs", are assigned anterior to "Data N" to "Data N+3" which are final data signals and which are the data signals to be beamforming-transmitted. Although the four "HT-LTFs" and the like are assigned to the first stream the same way as with the leading portion, "HT-SIG" is assigned between the first HT-LTF of "HT-LTF" and the second HT-LTF of "-HT-LTF". "Data N" is assigned posterior to the four "HT-LTFs" and the like. For the second to the fourth stream, the signals to which the CDD of −400 ns, −200 ns and −600 ns is applied are assigned thereto, respectively.

Figure 5:
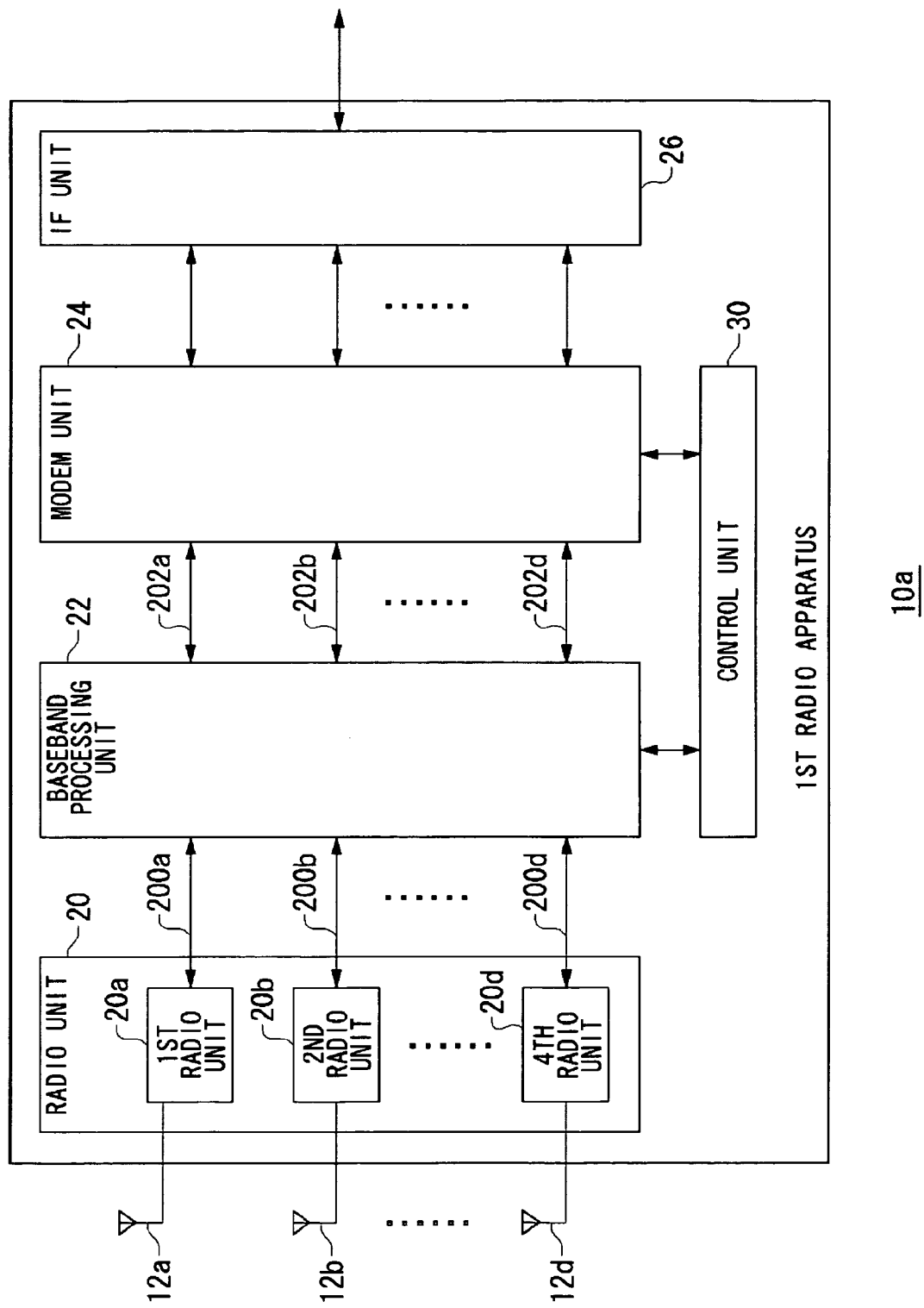
FIG. 5 illustrates a structure of a first radio apparatus shown in FIG. 2.

FIG. 5 illustrates a structure of a first radio apparatus 10a. The first radio apparatus 10a includes a first radio unit 20a, a second radio unit 20b, . . . and a fourth radio unit 24d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, in the following description, the description on the receiving operation corresponds to the processing by the second radio apparatus 10b, whereas the description on the transmission operation corresponds to the processing by the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12. The baseband processing unit 22 performs the beamforming transmission and the omni-transmission. The details will be discussed later.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 6:
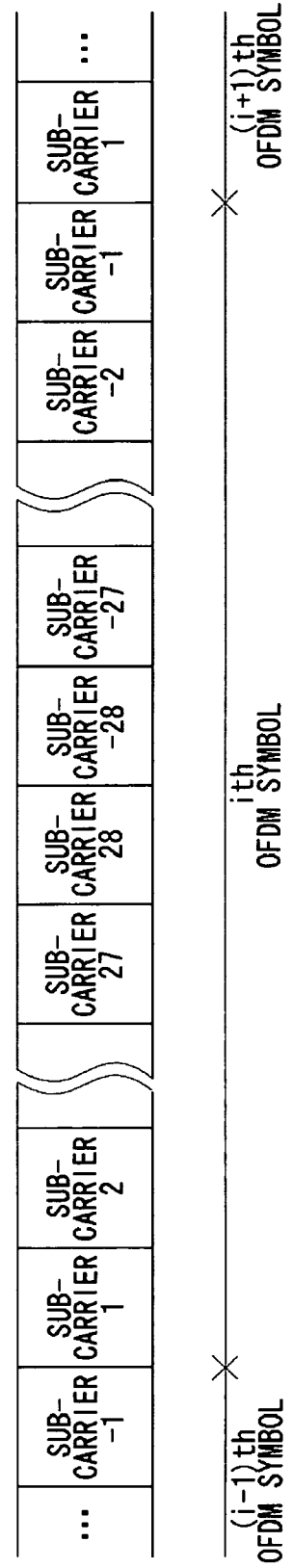
FIG. 6 illustrates a structure of a frequency-domain signal shown in FIG. 5.

FIG. 6 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like as shown in FIG. 4 or the like, a combination of "−26" to "26" is used for one "OFDM symbol".

Now refer back to FIG. 5. To produce the packet formats corresponding to FIG. 4, the baseband processing unit 22 carries out CDD. The details of the processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 generates packet formats, as shown in FIG. 4, for the modem unit 24 and the baseband processing unit 22 and performs processing to transmit the packet formats. The IF unit 26 inputs a plurality of data each of which is composed of a plurality of streams. The control unit 30 has the modem unit 24 and the baseband processing unit 22 generate each packet signal composed of a plurality of streams based on a plurality of data signals. In so doing, for the data which are to be beamforming-transmitted among a plurality of data, the control unit 30 performs the arrangement in the posterior part of the plurality of data. In other words, the control unit 30 assigns the data to be beamforming-transmitted, to the $\{(N+3)/4\}$-th data signal.

The control unit 30 appends the common HT-LTF and the like to a leading portion of a plurality of data, namely, to a position anterior to the First Data Signal of FIG. 3. Among a plurality of data signals, the control unit 30 assigns HT-LTF and the like to a position anterior to the data to be beamforming-transmitted. For the data to be omni-transmitted, the control unit 30 assigns the data of a high data rate to an anterior part of packet signal, and assigns the data of a lower data rate toward an posterior part of packet signal. Whether the data rate is high or low is determined based on the relative comparison among the data. Thus, these are not determined by the absolute measure. It is also assumed that the control unit 30 has acquired beforehand the data rate for data to be transmitted to a terminal apparatus.

For instance, the control unit 30 transmits a request signal of data rate information to a terminal apparatus via the radio unit 20, and receives and obtains from the terminal apparatus the data rate information as its response signal. The control unit 30 may receive signals from a terminal apparatus via the radio unit 20, the baseband processing unit 22, the modem unit 24 and the like and may estimate the data rate for said terminal apparatus based on said signal. In such a case, the control unit 30 estimates the data rate in response to the strength and the like of a received signal. In so doing, the control unit has stored beforehand a table which associates the strength of received signals with the data rates, so that the control unit 30 derives a data rate from the strength of a received signal by referring to this table.

Here, while fixing the number of streams, the control unit 30 sets, as data rate, a value defined by varying the modulation scheme or the coding rate. That is, the control unit 30 selects any among "2" to "4" as the number of streams, and maintains the thus selected value across one packet signal. It is to be noted that the number of streams may not be fixed.

The control unit 30 has the baseband processing unit 22 multiply a weight vector for each of a plurality of streams in the packet signal. More specifically, the control unit 30 has the baseband processing unit 22 multiply the data, which is to be beamformed and then transmitted, and HT-LTF corresponding to this data, in the packet signal by a weight vector for use in the beamforming transmission. The control unit 30 has the baseband processing unit 22 multiply a part to be omni-transmitted in the packet signal by a weight vector for use in the omni-transmission. It is assumed herein that the weight vector for beamforming transmission and the weight vector for omni-transmission had been stored beforehand. Since any known technique may be used to derive the weight vector for beamforming transmission, the description thereof is omitted here. An example for deriving the weight vector will be described later. The control unit 30 has the radio unit 20 transmit the packet signal in which the multiplication by the weight vector has been done.

On the other hand, a terminal apparatus estimates channel characteristics from HT-LTF placed in a leading portion of the received packet signal. The terminal apparatus demodulates the omni-transmitted data, based on the estimated channel characteristics. Here, the terminal apparatus identifies the data transmitted to itself, by HT-SIG assigned anterior to the data. The terminal apparatus again estimates the channel characteristics from HT-LTF assigned to a middle part of packet signal. This HT-LTF is HT-LTF which has been beamforming-transmitted. The terminal apparatus demodulates the beamforming-transmitted data, based on the estimated channel characteristics. After this, the terminal apparatus repeats the estimation of channel characteristics and the demodulation.

In the description given so far, the baseband processing unit 22 included in a terminal apparatus derives the weight vectors for adaptive array signal processing, based on "L-LTF" and "HT-LTF" shown in FIG. 4. However, it is assumed that the weight vectors are not updated during the period of omni-transmission. That is, the weight vector derived in a leading portion of packet signal will be used during the period of omni-transmission. Accordingly, a difference in error between the actual radio channel and the weight will be large in a posterior part of the omni-transmission period. On the other hand, if the data rate is low, the data error is more unlikely to occur than if the data rate is high. Thus, placing the data having a low data rate in a posterior part of the omni-transmission period can prevent the occurrence of error in this part.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 7:
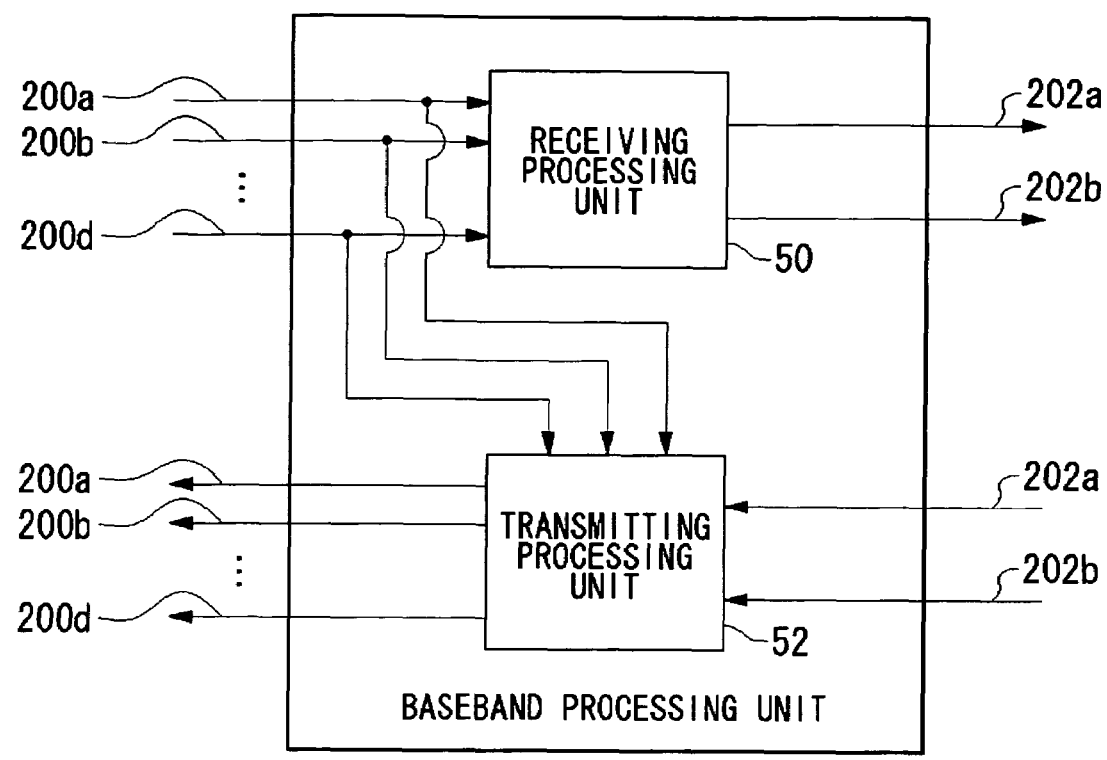
FIG. 7 illustrates a structure of a baseband processing unit shown in FIG. 5.

FIG. 7 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202.

The transmitting processing unit 52 executes a part, corresponding to a transmission operation, of operations by the baseband processing unit 22. That is, when executing the beamforming, the transmitting processing unit 52 multiplies the frequency-domain signal 202 by a steering matrix so as to generate the time-domain signal 200 for MIMO eigenmode transmission. With the above processing, the derivation of an H matrix, the singular value decomposition and the derivation of a steering matrix are carried out. To derive the H matrix, the transmitting processing unit 52 inputs the time-domain signal 200. When executing the omni-transmission, the transmitting processing unit 52 associates a plurality streams with a plurality of antennas 12, respectively.

Figure 8:
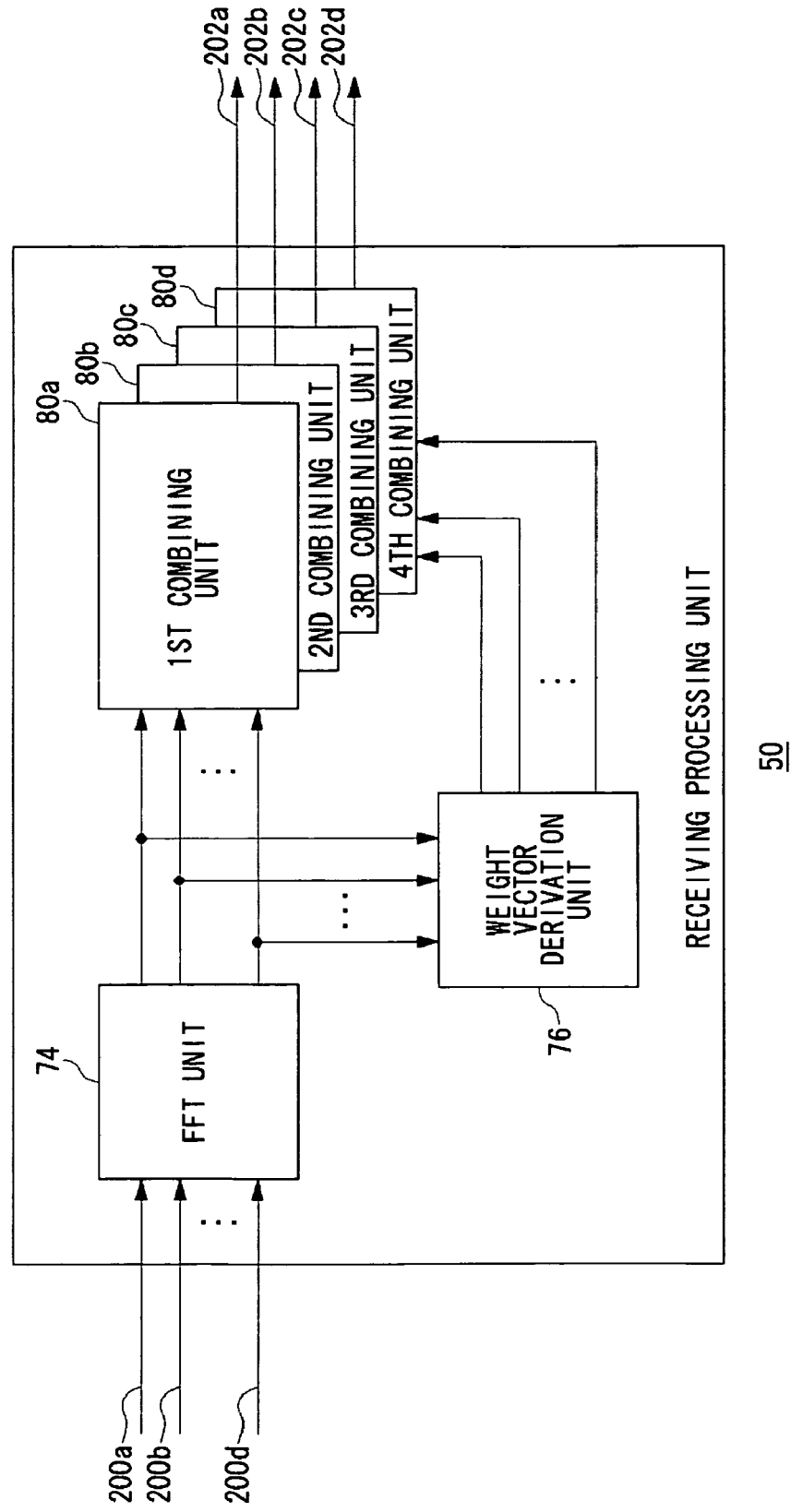
FIG. 8 illustrates a structure of a receiving processing unit shown in FIG. 7.

FIG. 8 illustrates a structure of the receiving processing unit 50. The receiving processing unit 50 includes an FFT unit 74, a weight vector derivation unit 76, and a first combining unit 80*a*, a second combining unit 80*b*, a third combining unit 80*c* and a fourth combining unit 80*d*, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 10. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or channel characteristics may be used. Since a known technique may be employed in the processing for the adaptive algorithm and so forth, the explanation thereof is omitted here. When deriving the weight vector, the weight vector derivation unit 76 executes an operation of the first component minus (−) the second component plus (+) the third component minus (−) the fourth component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80*a*, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202*a* to the fourth frequency-domain signal 202*d*, respectively.

Figure 9:
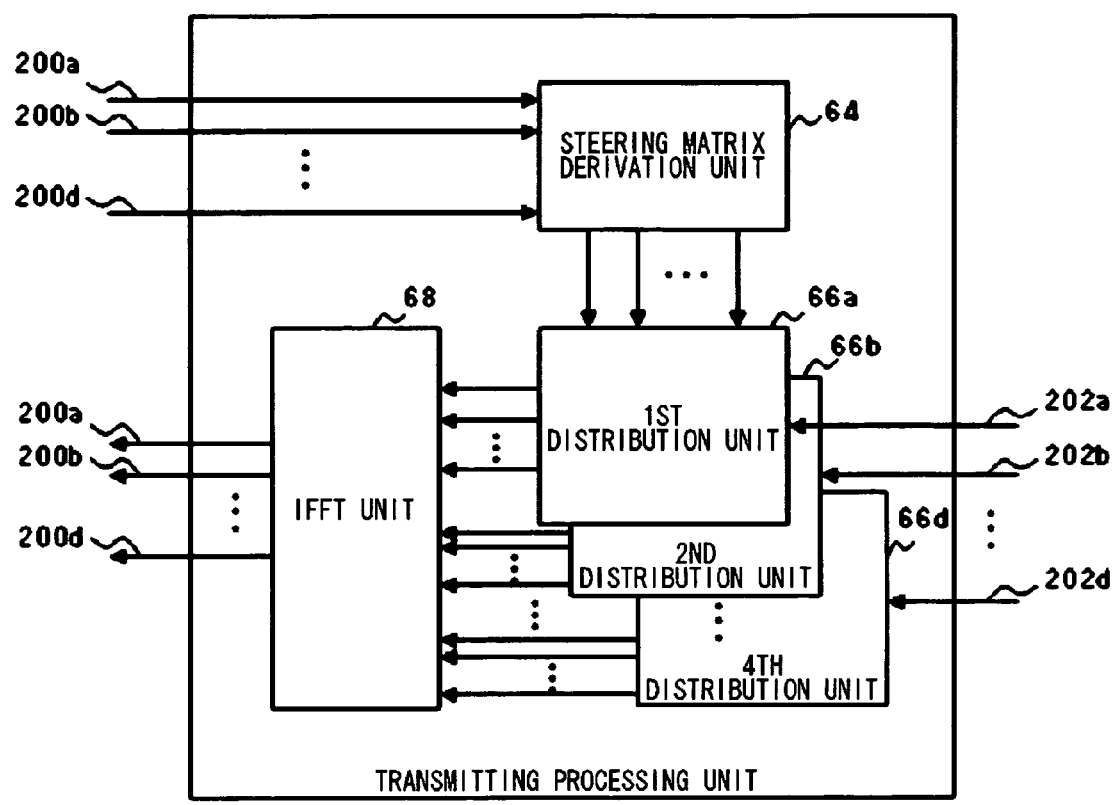
FIG. 9 illustrates a structure of a transmitting processing unit shown in FIG. 7.

FIG. 9 illustrates a structure of the transmitting processing unit 52. The transmitting processing unit 52 includes a steering matrix derivation unit 64, a first distribution unit 66*a*, a second distribution unit 66*b*, a third distribution unit 66*c* and a fourth distribution unit 66*d*, which is generically referred to as "distribution unit 66", and an IFFT unit 68. Here, the omni-transmission is achieved in a manner that a plurality of streams which constitute a packet signal are associated with the antennas 12 (not shown), respectively, and are then converted to the time domain by the IFFT unit 68. An operation of beamforming transmission will now be described.

The steering matrix derivation unit 64 performs a Fourier transform. As a result, the steering matrix derivation unit 64 converts the time-domain signal 200 into the frequency domain. The steering matrix derivation unit 64 outputs signals composed of multi-carriers by associating the signals with the time-domain signals 200. The structure of signal corresponding to each time-domain signal 200 is similar to that shown in FIG. 6.

The steering matrix derivation unit 64 derives an H matrix for each subcarrier. To facilitate explanation, the processing for one subcarrier will be described herein. A signal, received by an antenna 12 (not shown), which has been converted to the frequency domain by the steering matrix derivation unit 64 is expressed as a received signal vector Y in Equation (1). Here, Y denotes the number of antennas 12 as the number of elements. A signal transmitted from an antenna 14 (not shown) is expressed as a transmitted signal vector X in Equation (1). Here, X denotes the number of antennas 14 as the number of elements. Here, the antenna at the transmitting side corresponds to the antenna 14 whereas the antenna at the receiving side corresponds to the antenna 12. With the definitions as above, the relationship among Y, X and the H matrix is expressed by the following Equation (1).

$$Y = HX + n \quad (1)$$

where n is a noise vector. H matrix has the number of rows equivalent to the number of antennas 12 and the number of columns equivalent to the number of antennas 14. In the case of FIG. 2, each element of H matrix is expressed by the following Equation (2).

$$H = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \quad (2)$$

When beamforming such as MIMO eigenmode transmission is performed in the second radio apparatus 10b (not shown), its components may be contained in H matrix. The channel characteristic $h_{ij}$ contained in H matrix is derived using a correlation processing or the like, for example. Since the correlation processing is a known technique, the description thereof is omitted here.

The steering matrix derivation unit 64 subjects H matrix to Singular Value Decomposition for each subcarrier. The Singular Value Decomposition for H matrix is expressed by the following Equation (3).

$$H = U\Sigma V^H \quad (3)$$

where $\Sigma$ is a diagonal matrix expressed by the following Equation (4).

$$\Sigma = \mathrm{diag}[\sqrt{\lambda_1}, \Lambda, \sqrt{\lambda_m}] \quad (4)$$

In Equation (4), m corresponds to the number of channels set in a radio channel and may be the number which is smaller between the number of antennas 12 and the number of antennas 14. Here, $\Sigma$ is a matrix of m rows and m columns, and the components thereof are equivalent to gains in an eigenmode. U and V are singular matrices and are each a matrix of m rows corresponding to the number of the antennas 14 and m columns corresponding to the number of antennas 12. As a result of the above processing, a sigular matrix V is derived as a steering matrix. That is, a steering matrix of m columns corresponding to the number of antennas 12 is derived on a subcarrier-by-subcarrier basis, and the elements of such a steering matrix serve as weights for subcarriers contained in a stream to be transmitted, respectively. Here, the steering matrix derivation unit 64 stores the weights corresponding respectively to the terminal apparatuses.

The distribution unit 66 multiplies each of the streams to be transmitted, by the weights derived by the steering matrix derivation unit 64. The stream to be transmitted is indicated by the frequency-domain signal 202. Here, the first distribution unit 66a multiplies the first stream by the weights and the second distribution unit 66b multiplies the second stream by the weights. The multiplication is carried out on a subcarrier-by-subcarrier basis. The multiplication of streams by weights is expressed by the following Equation (5).

$$X = Vs \quad (5)$$

where s is a stream vector corresponding to the stream to be transmitted. "m" is defined by m rows. However, since two streams are considered here, m is the value which is effective for the two elements.

The IFFT unit 68 performs an IFFT on the frequency-domain signal outputted from the distribution unit 66 and outputs a time-domain signal. Note that an IFTT is carried out for the values corresponding to a plurality of subcarriers based on each of streams and antennas 12. That is, time-domain signals are generated by the number equal to the product of the number of streams multiplied by the number of antennas 12. Further, the IFFT unit 68 combines time-domain signals for a plurality of streams to be assigned to a single antenna 12 and outputs the result of the synthesis as a single time-domain signal 200. For example, time-domain signals for the first to fourth streams to be assigned to the first antenna 12s are combined.

According to embodiments of the present invention, a beamforming transmission can be realized because HT-LTF is added in an anterior part of data signals to be beamforming-transmitted even when a single packet signal is generated by aggregating a plurality of data. This arrangement can be used when a packet signal is to be transmitted by switching between omni-transmission and beamforming transmission. Also, data signals to be beamforming-transmitted are placed together in a posterior part of packet signal and therefore HT-LTF is not appended to the data signals to be omni-transmitted, so that the drop in transmission efficiency can be reduced.

Moreover, in the duration for omni-transmission, signals for terminal apparatuses requiring lower data rates are placed in a posterior part of a packet signal, so that the worsening of receiving characteristics can be reduced. Also, terminal apparatuses derive weight only in the foremost part of a packet signal, and data for terminal apparatuses requiring lower data rates are placed in rear parts of the omni-transmission duration even when errors contained in the weight increase in a rear part of the omni-transmission duration, so that the effects of errors contained in the weight can be reduced. And the thus reduced effects of errors contained in the weight can lead to the prevention of deterioration in receiving characteristics. Also, terminal apparatuses derive weights only in the foremost part of a packet signal, so that the amount of processing at the terminal apparatuses can be reduced. And the thus reduced the amount of processing at the terminal apparatuses can reduce the power consumption at the terminal apparatuses. Also, data for a plurality of terminal apparatuses are included in a single packet signal, so that the transmission efficiency can be improved.

The present invention has been described based on the embodiments which are only exemplary. It is therefore understood by those skilled in the art that other various modifications to the combination of each component and process are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

According to the embodiments of the present invention, a control unit 30 places data signals to be beamforming-transmitted in a posterior part of a packet signal. The arrangement, however, is not limited thereto, and data signals to be beamforming-transmitted may be placed in an intermediate part of a packet signal. When there are data signals, to be omni-transmitted, in a position posterior to data signals to be beamforming-transmitted, the control unit 30 appends HT-LTF to a place before the data signals to be omni-transmitted. In other words, known signals are added also to the data signals to be omni-transmitted which are data signals placed midway in a packet signal. A terminal apparatus re-estimates the channel characteristics corresponding to the omni-transmission based on the added HT-LTF and carries out a demodulation. The present modification can raise the freedom of placement of data signals within a packet signal. That is, HT-LTF may be added according as the necessity arises.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
   an input unit which inputs a plurality of data signals each of the data signals being composed of a plurality of streams;
   a generation unit which generates a single packet signal composed of a plurality of streams, based on the plurality of data signals inputted in said input unit; and
   a transmitter which multiplies the packet signal, generated by said generation unit, by a weight vector for each of the plurality of streams and which transmits the packet signal multiplied by the weight vector,
   wherein said generation unit appends a common known signal to a leading part of the plurality of data signals and appends a dedicated known signal to a position anterior to a data signal by which a dedicated weight vector is to be multiplied in said transmitter among the plurality of data signals, and
   wherein, among the packet signals generated by said generation unit, said transmitter multiplies the dedicated known signal and a data signal placed posterior thereto by the dedicated weight vector and, among the packet signals generated by said generation unit, said transmitter multiplies a part, where no dedicated weight vector is to be multiplied, by a common weight vector.

2. A radio apparatus according to claim 1, wherein, among the plurality of data signals, said generation unit generates packet signals after assigning a plurality of data signals to a posterior part has been performed on a data signal by which the dedicated weight vector is to be multiplied in the transmitter.

3. A radio apparatus according to claim 1, wherein when among the plurality of data signals there is a data signal, where the common weight vector is to be multiplied, in said transmitter in a position posterior to a data signal where the dedicated weight vector is to be multiplied in said transmitter, said generation unit appends the common known signal to a position anterior to the data where the common weight vector is to be multiplied in said transmitter.

4. A radio apparatus according to claim 1, wherein said generation unit is such that a data signal of a high data rate is assigned to an anterior part of packet signal and a data signal of a lower signal is assigned toward a posterior part of packet signal.

5. A radio apparatus, comprising:
   an input unit which inputs a plurality of data signals each of the data signals being composed of a plurality of streams;
   a generation unit which generates packet signals composed of a plurality of streams, based on the plurality of data signals inputted in said input unit; and
   a transmitter which multiplies the packet signal, generated by said generation unit, by a weight vector for each of the plurality of streams and which transmits the packet signal multiplied by the weight vector,
   wherein said generation unit appends a common known signal to a leading part of the plurality of data signals and appends a dedicated known signal to a position anterior to a data signal by which a dedicated weight vector is to be multiplied in said transmitter among the plurality of data signals, and
   wherein, among the packet signals generated by said generation unit, said transmitter multiplies the dedicated known signal and a data signal placed posterior thereto by the dedicated weight vector and, among the packet signals generated by said generation unit, said transmitter multiplies a part, where no dedicated weight vector is to be multiplied, by a common weight vector.

* * * * *